United States Patent
Sato et al.

(10) Patent No.: US 8,312,294 B2
(45) Date of Patent: Nov. 13, 2012

(54) INFORMATION PROCESSING APPARATUS, AUTHENTICATION METHOD, AND STORAGE MEDIUM

(75) Inventors: Jun Sato, Kokubunji (JP); Shinichi Matsukawa, Tokyo (JP); Taku Kato, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 671 days.

(21) Appl. No.: 12/504,563

(22) Filed: Jul. 16, 2009

(65) Prior Publication Data

US 2010/0017626 A1    Jan. 21, 2010

(30) Foreign Application Priority Data

Jul. 18, 2008   (JP) .................................. 2008-187856

(51) Int. Cl.
*G06F 12/14* (2006.01)

(52) U.S. Cl. ........................................................ 713/193

(58) Field of Classification Search ......................... None
See application file for complete search history.

(56) References Cited

U.S. PATENT DOCUMENTS

| | | | | |
|---|---|---|---|---|
| 7,227,952 | B2 * | 6/2007 | Qawami et al. ............... | 380/201 |
| 7,840,818 | B2 * | 11/2010 | Sabet-Sharghi et al. ...... | 713/193 |
| 2003/0163717 | A1 | 8/2003 | Yoshimoto et al. | |
| 2005/0160284 | A1 | 7/2005 | Kitani et al. | |
| 2006/0136342 | A1 | 6/2006 | Nakamura et al. | |
| 2000/7004376 | | 2/2007 | Kasahara et al. | |
| 2008/0002827 | A1 | 1/2008 | Tachikawa et al. | |
| 2008/0002828 | A1 | 1/2008 | Tachikawa et al. | |

FOREIGN PATENT DOCUMENTS

| | | |
|---|---|---|
| JP | 2003-256282 | 9/2003 |
| JP | 2004-220317 | 8/2004 |
| JP | 2005-275654 | 10/2005 |
| JP | 2006-172147 | 6/2006 |
| JP | 2006-217218 | 8/2006 |
| JP | 2007-052633 | 3/2007 |
| JP | 2007-334939 | 12/2007 |
| JP | 2007-335996 | 12/2007 |
| JP | 2008-35397 | 2/2008 |

OTHER PUBLICATIONS

Content Protection for Recordable Media Specification: SC Memory Card Book Common Part, Revision 0.961, May 3, 2007.
"SD Memory Card Specification and Content Production Technology" Matsushita Technical Journal—Apr. 4, 2002, pp. 9, vol. 48 No. 2.
TechnoWorld, MagicGate. pp. 4, Nov. 20, 2008 accessed from Wayback Machine to get date.

* cited by examiner

*Primary Examiner* — Brandon Hoffman
(74) *Attorney, Agent, or Firm* — Blakely, Sokoloff, Taylor & Zafman LLP

(57) ABSTRACT

According to one embodiment, a storage medium comprises an encrypted content, key management information which is updated whenever necessary and includes a media key block including encrypted media keys obtained by encrypting a media key which is a base of an authentication key used for mutual authentication with another apparatus by using different device keys, and first and second application keys which encrypt the title keys for each application of the content and are alternately updated and encrypted when the key management information is updated.

8 Claims, 7 Drawing Sheets

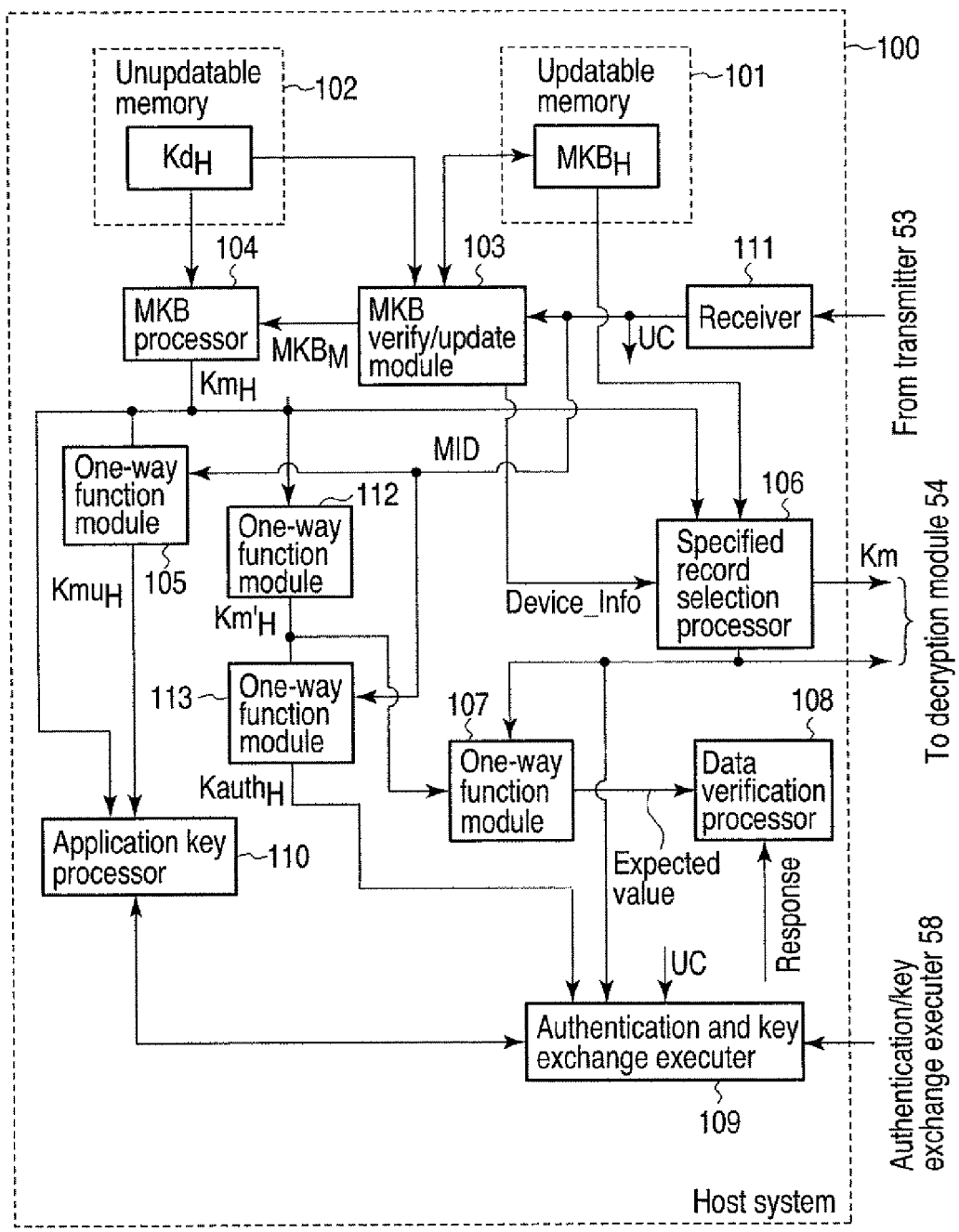
F I G. 1

| | | |
|---|---|---|
| ----- | | |
| Version No. | | |
| Media key verification record Enc (Km, fixed data) | | |
| Each record of encrypted media key | '1' | Enc(Kd_1,Km) |
| | --- | ----- |
| | '100' ~ '199' | Enc(Kd_k,Km) |
| | --- | ----- |
| | 'xxx' ~ 'xxxx' | Enc(Kd_n,Km) |
| ----- | | |
| Each record of media key prime | '1' | Enc(Kd_1,K'm) |
| | --- | ----- |
| | '100' ~ '199' | Enc(Kd_k,Km') |
| | --- | ----- |
| | 'xxx' ~ 'xxxx' | Enc(Kd_n,Km') |
| ----- | | |
| Each record of UV descriptor key | '1' | UV [1] |
| | --- | ----- |
| | '100' ~ '199' | UV [k] |
| | --- | ----- |
| | 'xxx' ~ 'xxxx' | UV [n] |
| ----- | | |

F I G. 3

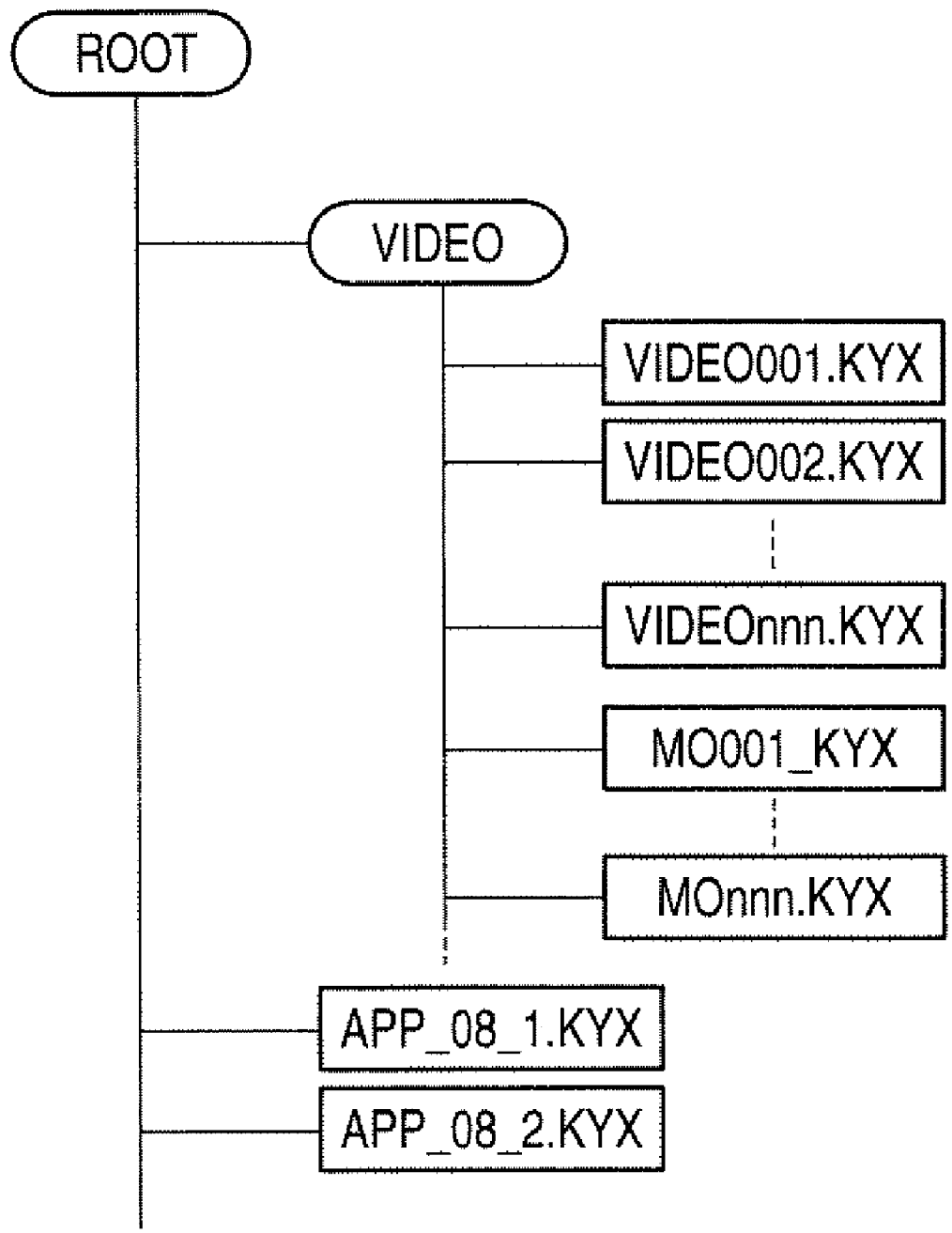
F I G. 4

INFORMATION PROCESSING APPARATUS, AUTHENTICATION METHOD, AND STORAGE MEDIUM

CROSS-REFERENCE TO RELATED APPLICATIONS

This application is based upon and claims the benefit of priority from Japanese Patent Application No. 2008-187856, filed Jul. 18, 2008, the entire contents of which are incorporated herein by reference.

BACKGROUND

1. Field

One embodiment of the invention relates to technology for protecting contents recorded on recordable storage media, and in particular to an information processing apparatus, authentication method, and a storage medium for revoking illegal or invalid apparatuses and illegal or invalid media.

2. Description of the Related Art

There is a memory card called a secure digital (SD) Memory card as an example of content storage media. An SD Memory Card adopts a content protection technology called content protection for recordable media (CPRM). The CPRM uses the following technology.

A mutual authentication system is adopted as a scheme for reading/writing management information, such as a cipher key used for encrypting contents for protection, from/to a memory card. Further, as a scheme for revoking an illegal apparatus, technology using key management information called a media key block is adopted (see Content Protection for Recordable Media Specification: SD Memory Card Book Common Part, Revision 0.961, May 3, 2007). An illegal apparatus removes protective information which has been added to contents by a content protection technology, falsifies contents, or discloses confidential information thereof.

Key management information is issued by a technology license organization. Key management information disables decryption of an encrypted content stored in a storage medium such as a memory card by an apparatus recognized as an illegal apparatus when the license is issued (invalidation or exclusion of an illegal apparatus, which is sometimes called revoke). Key management information includes two or more encrypted media keys obtained by encrypting a specific media key by two or more different device keys. A media key is key information used for encryption of a cipher key itself for authentication or encryption of a storage medium and both apparatuses used for communication. A device key is key information assigned uniquely or constantly to each storage medium and each apparatus. At least one device key is stored in a storage medium or apparatus. If key management information invalidating the media key is newly generated and used for authentication of an illegal apparatus, authentication of an illegal apparatus fails. As a result, an illegal apparatus can be disabled or excluded. Therefore, key management information must be the latest reflecting information about an illegal apparatus known when the storage medium is manufactured. If not, robust and efficient invalidation of an illegal apparatus is impossible. Therefore, a memory card adopts a scheme to update key management information.

Unlike a magnetic disc and an optical disc such as a digital versatile disc (DVD), a memory card itself includes a controller in addition to a flash memory for storing data. The controller is used for mutual authentication between a memory card and an information processing apparatus, to prevent reading or writing of data such as a cipher key and key management information by an illegal apparatus.

On the other hand, in a key management method which protects copyright of contents by recording and storing contents on recording media having a secret area, a method of encrypting a content by a title key to prevent wasteful use of a secret area has been proposed (Jpn. Pat. Appln. KOKAI Publication No. 2006-217218).

A method of mutual authentication for ensuring the safety of copyright protection technology has also been proposed (Jpn. Pat. Appln. KOKAI Publication No. 2004-220317).

When key management information in a memory card is updated, it is necessary to re-encrypt and rewrite a title key in a protected area of a memory card by using a media unique key specific to a memory card derived from the key management information. There are many title keys (e.g., several thousands), and if a user removes a memory card from an apparatus while re-encrypted title keys are being written in a protected area, re-encryption of all title keys is not completed, some title keys are encrypted by an old media unique key, not all title keys are normally encrypted, and the contents may not be decrypted.

The above problem in an SD Memory Card occurs in other memory cards.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary diagram showing an example of a configuration of a host system according to an embodiment of the invention;

FIG. 3 is an exemplary diagram showing an example of a data structure of a media key block according to an embodiment of the invention;

FIG. 4 is an exemplary diagram showing an example of a directory structure of a protected area according to an embodiment of the invention;

DETAILED DESCRIPTION

Various embodiments according to the invention will be described hereinafter with reference to the accompanying drawings. In general, according to one embodiment of the invention, a storage medium which stores an encrypted content, comprising title keys configured to encrypt an content, key management information which is updated whenever necessary and includes a media key block including encrypted media keys obtained by encrypting a media key which is a base of an authentication key used for mutual authentication with another apparatus by using different device keys, and first and second application keys which encrypt the title keys for each application of the content and are alternately updated and encrypted when the key management information is updated.

First Embodiment

In this embodiment, a media key block MKB used in an advanced access content system (AACS) is used as key management information. As two information processing apparatuses to authenticate each other, a memory card having a controller and a storage area limited to access as a security function like an SD Memory Card, and a host system for executing an application to read/write data from/to a memory card, will be explained. An SD Memory Card will be explained as a memory card.

Figure 2:
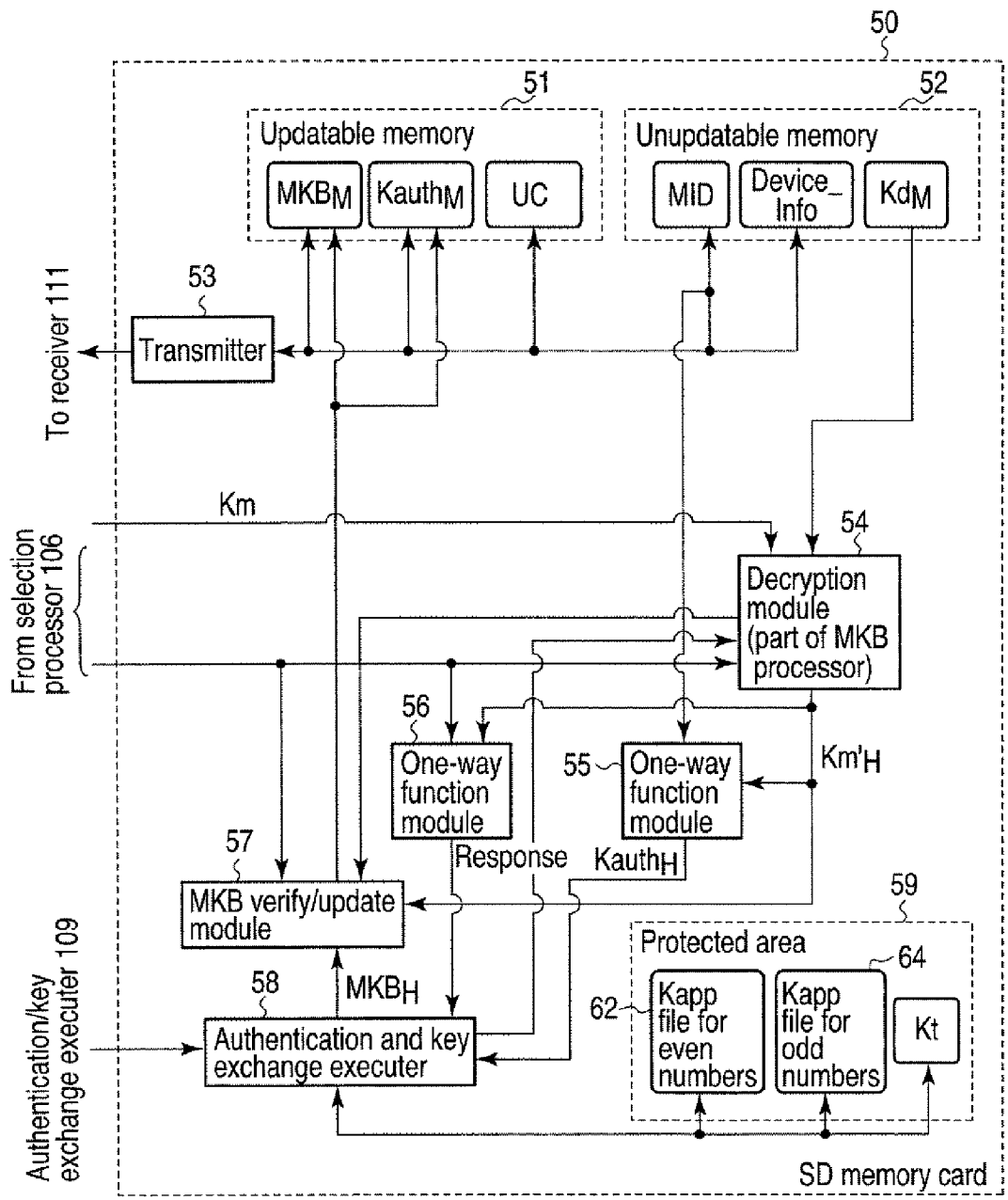
FIG. 2 is an exemplary diagram showing an example of a configuration of an SD Memory Card according to an embodiment of the invention.

FIG. 1 shows a configuration of a host system 100 according to this embodiment. FIG. 2 shows a configuration of an SD Memory Card 50 according to this embodiment.

The host system 100 has a hardware configuration using an ordinary computer and comprises at least a controller such as a central processing module (CPU) for controlling a whole apparatus, a memory such a read-only memory (ROM) and a random access memory (RAM) for storing various data and programs including application programs, and a bus for connecting these modules. In the host system 100, a display device for displaying information, an input device such as a keyboard and a mouse for accepting instructions from a user, and a communication interface (I/F) for controlling communication with an external device are connected with or without wire. The SD Memory Card 50 has a CPU, a controller having a ROM and a RAM, and a storage area to store various data and programs.

Concerning usage of key management information, an explanation will be given of data stored in the SD Memory Card 50 and host system 100.

As shown in FIG. 2, the SD Memory Card 50 has an updatable memory 51, an un-updatable memory 52, and a protected area 59 limited to access. The protected area 59 cannot be accessed unless the host system 100 and SD Memory Card 50 are successfully and mutually authenticated each other. The SD Memory Card 50 includes a user data area for storing encrypted contents. However, this area is not related to the operation of the present invention so that a description thereof is omitted. If the size of a content is larger than 128 bits, the content is encrypted based on a CBC mode of AES encryption method. If the size of the last block of the content is not larger than 128 bits, the last block is not encrypted. The size of the content is not larger than 128 bits, the content is not encrypted.

The updatable memory 51 stores data which can be updated. The updatable memory 51 stores a media key block $MKB_M$, an authentication key $Kauth_M$, and an update counter UC which is a count value of an update counter which is incremented upon the media key block MKB in the card is updated. It is sufficient for the host system 100 to determine whether the update counter UC is odd or even. Therefore, the host system 100 judges the least significant bit of the update counter UC having a plurality of bits.

The un-updatable memory 52 stores data which cannot be updated. The un-updatable memory 52 stores a media identifier MID, a device key ($Kd_M$) set, and a device information number (Device_Info or Device_node). The protected area 59 stores a title key (Kt) file, an application key (Kapp) file 62 for even numbers, and an application key (Kapp) file 64 for odd numbers. Parts of content are encrypted by title keys unique to the parts. A plurality of title keys (Kt) and title key files may be stored in the protected area 59. The title key files for an application are encrypted by an application key file (Kapp) unique to the application. The application key file (Kapp) is encrypted by a media unique key Kmu related to a media key block MKB. Two application key files are set for each media key block MKB; one is the application key (Kapp) file 62 for even numbers, and the other is the application key (Kapp) file 64 for odd numbers. The host system 100 determines which one of the application key (Kapp) files 62 and 64 is valid. When the host system 100 requests the SD Memory Card 50 to send a media key block $MKB_M$, the SD Memory Card 50 returns the media key block $MKB_M$ and the updated counter UC to the host system 100. When the updated counter UC is an even number, the application key (Kapp) file 62 for the even numbers is valid and the application key (Kapp) file 64 for the odd numbers is invalid. When the updated counter UC is an odd number, the application key (Kapp) file 62 for the even numbers is invalid and the application key (Kapp) file 64 for the odd numbers is valid. "0" is regarded as an even number. The title key Kt is encrypted and the encrypted title key Kt is supplied to the SD Memory Card 50 from the host system 100 through the authentication and key exchange executer 109 and 58 in the same manner as the encrypted application key file.

A media identifier MID is media identification information capable of uniquely identifying the SD Memory Card 50, and corresponds to identification information. The MID has a 128-bit size, for example, and includes a device node of a media device key ($Kd_M$) set.

A media key block $MKB_M$ is key management information including two or more encrypted media keys Km (encrypted secret keys), which are media keys (secret keys) encrypted by two or more device keys. In order to support two or more applications, a memory card includes two or more, for example, eight media key blocks MKB. A maximum size of a media key block MKB is 1 megabyte, for example.

A device key ($Kd_M$) set is key information assigned to each information processing apparatus such as the SD Memory Card 50 and host system 100, and includes at least one device key Kd capable of decrypting an encrypted media key Km, and corresponds to a device secret key. A device key ($Kd_M$) set is uniquely assigned to each information processing apparatus. A device key ($Kd_M$) set includes a device node, more than one media device key $Kd_M$, and an uv number (UV) related to each device key.

A device information number is index information to identify a device key ($Kd_M$) set. A device information number corresponds to identification information, and is used to identify an encrypted media key Km included in a media key block MKB.

An authentication key $Kauth_M$ is set for each media key block $MKB_M$, and is calculated by computing one-way function (AES) by a media identifier MID and media key prime (described later). An authentication key $Kauth_M$ has a 128-bit length, for example.

A media unique key Kmu is obtained by computing one-way function of a media identifier MID and a media key Km, and corresponds to a secret unique key.

Concerning the key management information (media key block MKB), when it is necessary to discriminate the information stored in the SD Memory Card 50 from that stored in the host system 100, the former is described as a media key block $MKB_M$, and the latter is described as a media key block $MKB_H$. If the discrimination is unnecessary, the key management information is simply described as a media key bock MKB.

Similarly, concerning a device key set, when it is necessary to discriminate a key set stored in the SD Memory Card 50 from that stored in the host system 100, the former is described as $Kd_M$, and the latter is described as $Kd_H$. If the discrimination is unnecessary, the key set is simply described as a device key (Kd) set.

Concerning a media key Km, when it is necessary to discriminate a key decrypted based on a media key block $MKB_M$ from that decrypted based on a media key block $MKB_H$, the former is described as $Km_M$, and the latter is described as a key $Km_H$. If the discrimination is unnecessary, the key is simply described as a media key Km.

Similarly, concerning a media unique key Kmu, when it is necessary to discriminate a key generated based on a media key block $MKB_M$ from that generated based on a media key block $MKB_H$, the former is described as $Kmu_M$, and the latter is described as a key $Kmu_H$. If the discrimination is unnecessary, the key is simply described as a media unique key Kmu.

As shown in FIG. 1, the host system 100 has an updatable memory 101, and an un-updatable memory 102, as storage areas, like the SD Memory Card 50.

The updatable memory 101 stores a media key block $MKB_H$. A media key block $MKB_H$ may be written in the host system 100 when an application executed by the host system 100 is manufactured (or shipped), or may be distributed to the host system 100 after shipment by using a network or other media.

The un-updatable memory 102 stores a device key ($Kd_H$) set necessary for decrypting a media key block $MKB_H$ stored in the updatable memory 101. A device key ($Kd_H$) set includes a device node, 325 pairs of device keys $Kd_H$ and uv numbers (UV) associated with device keys $Kd_H$.

Next, in the above hardware structure, an explanation will be given of a function associated with this embodiment out of the various functions realized by executing various programs stored by the CPU in a ROM or a storage area in the SD Memory Card 50. Here, it is assumed that the SD Memory Card 50 uses a media key block $MKB_M$ stored in the updatable memory 51 as usable key management information.

As shown in FIG. 2, the SD Memory Card 50 realizes functions of a transmitter 53, a decryption module 54, a one-way function module 55, a one-way function module 56, a MKB verify/update module 57, and an authentication and key exchange executer 58.

The transmitter 53 transmits the media key block $MKB_M$, authentication key $Kauth_M$ and update counter UC stored in the updatable memory 51, and the media identifier MID and device information number stored in the un-updatable memory 52, to the host system 100 through the transmitter 53.

The decryption module 54 executes a part of MKB process. When the media key block $MKB_M$ stored in the SD Memory Card 50 is older than the media key block $MKB_H$ stored in the host system 100, the decryption module 54 receives from the host system 100 an encrypted media key $Km_H$ which is identified by a device information thereof and is a part of a media key block $MKB_H$, the part being a record. The encrypted media key $Km_H$ corresponds to a device key (Kd) set identified by its own device information number. The decryption module 54 decrypts the received encrypted media key $Km_H$ by using one of the device keys included in the device key ($Kd_M$) set, and obtains a media key prime $Km'_H$ by computing one-way function by a media key and a predetermined value.

The one-way function module 55 obtains an authentication key $Kauth_H$ by computing one-way function by the media identifier MID and media key prime $Km'_H$.

The one-way function module 56 generates a media key prime response (described later) by computing one-way function by the media key prime $Km'_H$ and medial key prime data (described later), and sends the media key prime response to the host system 100 through the authentication and key exchange executers 58 and 109.

The MKB verify/update module 57 receives all media key blocks $MKB_H$ from the host system 100 according to the result of verification in the host system 100, and verifies the media key blocks $MKB_H$ According to the result of verification, the MKB verify/update module 57 replaces the media key block $MKB_M$ stored in the updatable memory 51 with the media key block $MKB_H$, and replaces the authentication key $Kauth_M$ stored in the updatable memory 51 with the authentication key $Kauth_H$ obtained from the media key block $MKB_H$ by the one-way function module 55.

The authentication and key exchange executer 58 executes authentication (AKE mutual authentication) and key exchange for encrypted communication using the authentication key $Kauth_H$ shared by the host system 100. The authentication (AKE mutual authentication) and key exchange are securely executed by keeping the secret of contents.

Next, an explanation will be given on the function associated to this embodiment out of the functions realized by the control module of the host system 100 by executing various programs stored in the storage module or external storage module.

As shown in FIG. 1, the host system 100 realizes functions of a receiver 111, a MKB verify/update module 103, a media key block MKB processor 104, a one-way function module 105, an application key processor 110, one-way function modules 112 and 113, a specified record selection processor 106, a one-way Function 107, a data verification processor 108, and an authentication and key exchange executer 109.

When receiving the media key block $MKB_M$, media identifier MID, and device information number from the SD Memory Card 50, the MKB verify/update module 103 verifies the validity of the media key block $MKB_M$ by using the device key set $Kd_H$ stored in the un-updatable memory 102. The MKB verify/update module 103 compares the media key block $MKB_M$ with the media key block $MKB_H$ stored in the updatable memory 101. When the media key block $MKB_H$ is older, the MKB verify/update module 103 replaces the media key block $MKB_H$ stored in the updatable memory 101 with the media key block $MKB_M$. On the other hand, when the media key block $MKB_H$ is newer, the MKB verify/update module 103 sends a device information number to the specified record selection processor 106.

The specified record selection processor 106 sends the SD Memory Card 50 an encrypted media key Km identified by the device information number received from the MKB verify/update module 103. The encrypted media key Km which corresponds to a device key set Kd identified by the device information number and is a part of the media key block $MKB_H$ stored in the updatable memory 101, the part being a record.

The MKB processor 104 obtains a media key $Km_H$ by processing the media key block $MKB_H$ by using one of the device keys included in the device key set $Kd_H$ stored in the un-updatable memory 102.

The one-way function module 105 obtains a media unique key $Kmu_H$ by computing one-way function by the media identifier MID received from the SD Memory Card 50 and the media key $km_H$ obtained by the media key block MKB processor 104. The media unique key $Kmu_H$ is supplied to the application key processor 110. An application key is supplied from the protected area 59 of the SD Memory Card 50 to the application key processor 110 through the authentication and key exchange executers 109 and 58, and the processed application key is sent back to the protected area 59 of the SD Memory Card 50 through the authentication and key exchange executers 109 and 58.

The one-way function module 112 computes one-way function by a media key $Km_H$ and a constant, and obtains a media key prime $Km'_H$.

The one-way function module 113 computes one-way function by a media key prime $Km'_H$ and a media identifier MID, and obtains an authentication key $Kauth_H$. The obtained authentication key $Kauth_H$ is supplied to the authentication and key exchange executer 109.

The one-way function module 107 computes one-way function by a media key prime $Km'_H$ and media key prime data (described later), and obtains an expected value of a media key prime response (described later). The obtained expected value is supplied to the data verification processor 108.

The data verification processor 108 receives a response from the SD Memory Card 50 in response to the transmission of the encrypted media key Km by the specified record selection processor 106, and compares the received response with the expected value, and verifies the validity of the response. After verifying the validity of the response, the data verification processor 108 sends the entire media key block $MKB_H$ to the SD Memory Card 50. Though a transmission path is not shown, the data is transmitted through the authentication and key exchange executers 109 and 58.

The application key processor 110 reads the update counter UC of the media key block MKB obtained from the updateable memory 51 of the SD Memory Card 50, determines which one of the application key file 62 for even numbers and the application key file 64 for odd numbers in the protected area 59 is valid or Invalid, re-encrypts a valid application key file by a media unique key $Kmu_H$, and overwrites the re-encrypted application key file on an invalid application key file. Application key files are communicated between the SD Memory Card 50 and host system 100 through the authentication and key exchange executers 109 and 58.

A data structure of the media key block MKB is explained by using FIG. 3. The media key block MKB includes a version number, a media key verification data, records of two or more encrypted media keys, records of two or more media key primes, and records of two or more UV descriptors.

A version number indicates a version of the media key block MKB, which is information (comparison management information) usable for comparing old and new media key blocks MKB.

A media key verification record is used to verify a media key block MKB when the SD Memory Card 50 receives it from the host system 100. Specifically, a media key verification record is fixed data (e.g., a numeric sequence "01234xxx") encrypted by a media key Km. Fixed data is previously and separately stored in the SD Memory Card 50.

An encrypted media key is included in a media key block MKB as records separated one by one for each block information number or a group of block information numbers. For example, one encrypted media key corresponding to a block information number "1" is included separately from one encrypted media key corresponding to block information numbers "100" to "199". A device key set corresponds to each block information number as described above, and each encrypted media key can be decrypted by one device key included in a device key set corresponding to the block information number.

An encrypted media key prime is stored like an encrypted media key. Records of an encrypted media key and encrypted media key prime may be arranged as blocks for each type of data as shown in FIG. 3, or may be mixed in one block.

FIG. 4 shows an example of a directory structure of a protected area. In the protected area, a directory is assigned by each application. A directory name is "XXX". The "XXX" is a name of SD application. A file name to store an encrypted title key in each directory is "YYY.KYX". The "YYY" is assigned by an SD application. A file name to store an encrypted application key related to each media key block MKB is "APP_nn_x.KYX". The "nn" is a number (decimal 00 to 07) of a media key block MKB, 1 of "X" indicates an odd number, 2 indicates an even number.

FIG. 4 shows an example of a bunch of title keys for video contents. A directory name is "VIDEO". A file to store a bunch of title keys for encrypting video contents is "VIDEOnnn.KYX", or "MOnnn.KYX". The "nnn" is a decimal number. "APP_08_1.KYX" is an application key file (for odd numbers) for a video application. "APP_08_2.KYX" is an application key file for even numbers. When the update counter of the media key block MKB is 0, "APP_08_2.KYX" is a valid application key file.

One application key is assigned to one application. Namely, one application key is assigned to one media key block MKB. In contrast, two application key files are set, one for odd numbers and the other for even numbers. When two or more media key blocks MKB are stored in a memory card, two or more application keys are present for each MKB. The above-mentioned title key for video contents is encrypted by one application key. Further, an application key is encrypted by a media unique key Kmu specific to a memory card. A media unique key is a value, which can be calculated from a MKB, device key set, and media identifier.

A media key Km is obtained by processing a MKB by a device key Kd. A media unique key Kmu is obtained by computing one-way function by a media key Km and a media identifier MID.

On the other hand, a media key prime Km' is obtained by computing one-way function by a media key Km and a constant. An authentication key Kauth is obtained by computing one-way function by a media identifier MID and a media key prime Km'.

Figure 5:
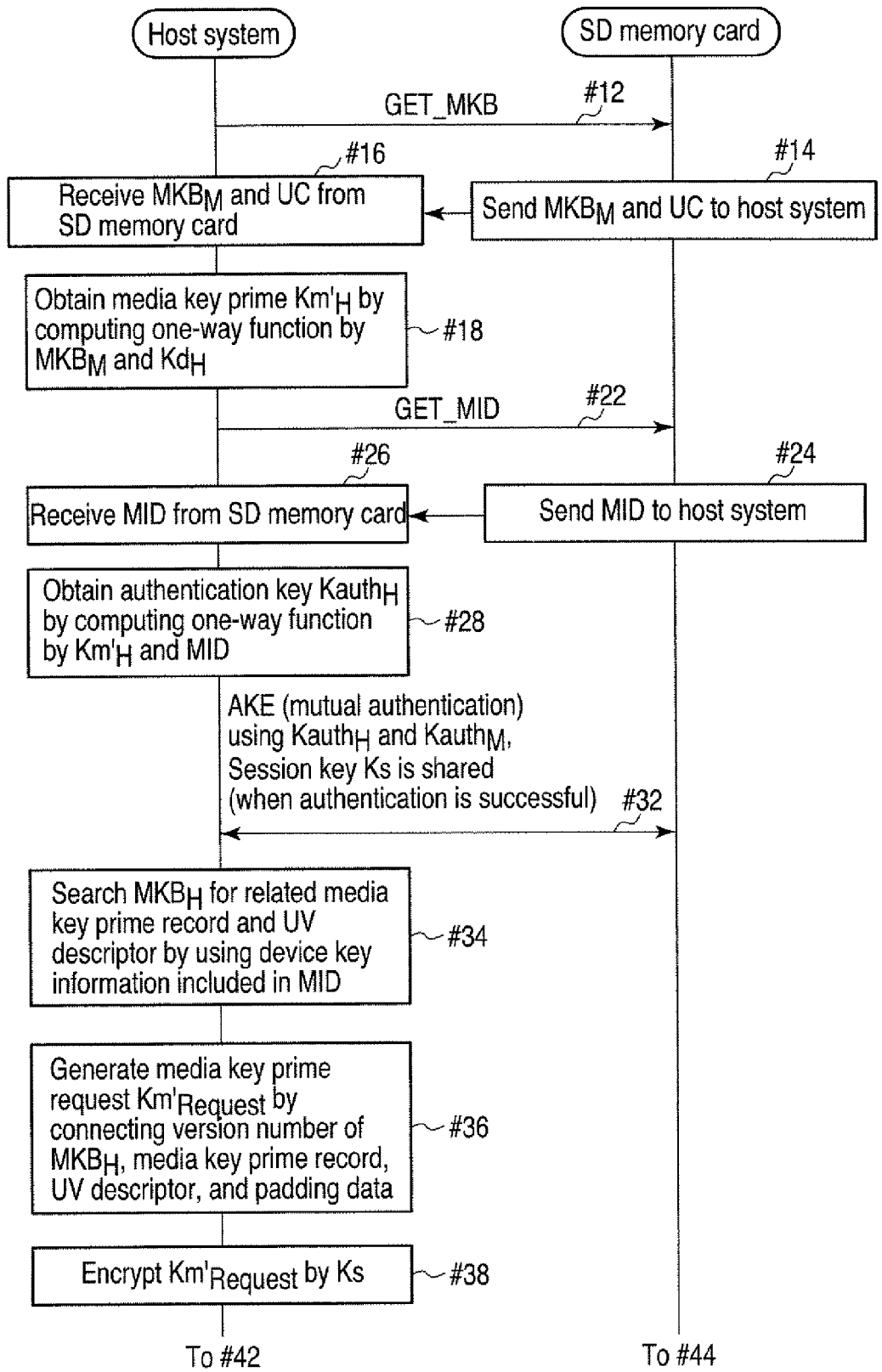
FIG. 5 is an exemplary flowchart showing the former half of an update process according to an embodiment of the invention.
Figure 6:
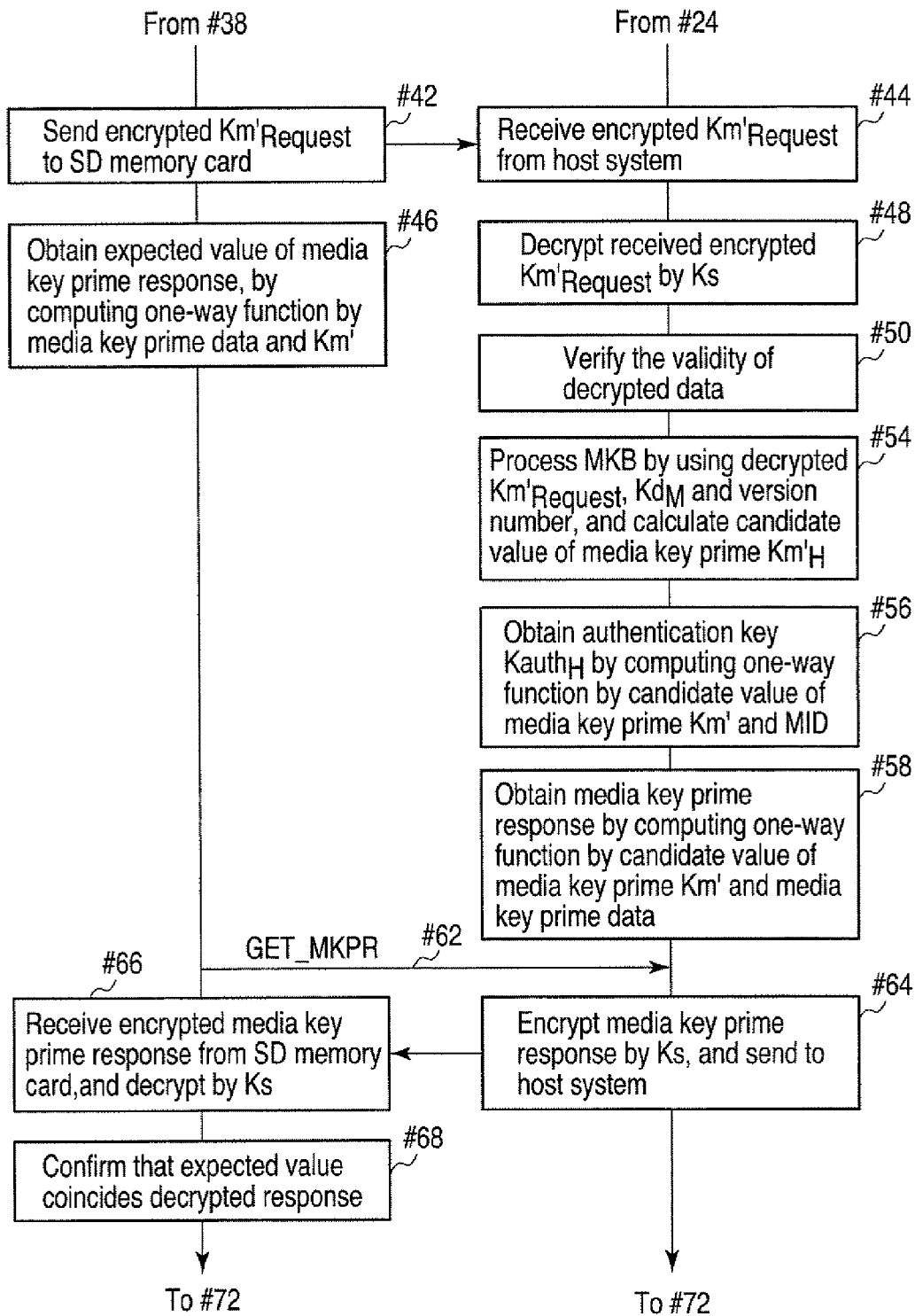
FIG. 6 is an exemplary flowchart showing the middle part of an update process according to an embodiment of the invention.
Figure 7:
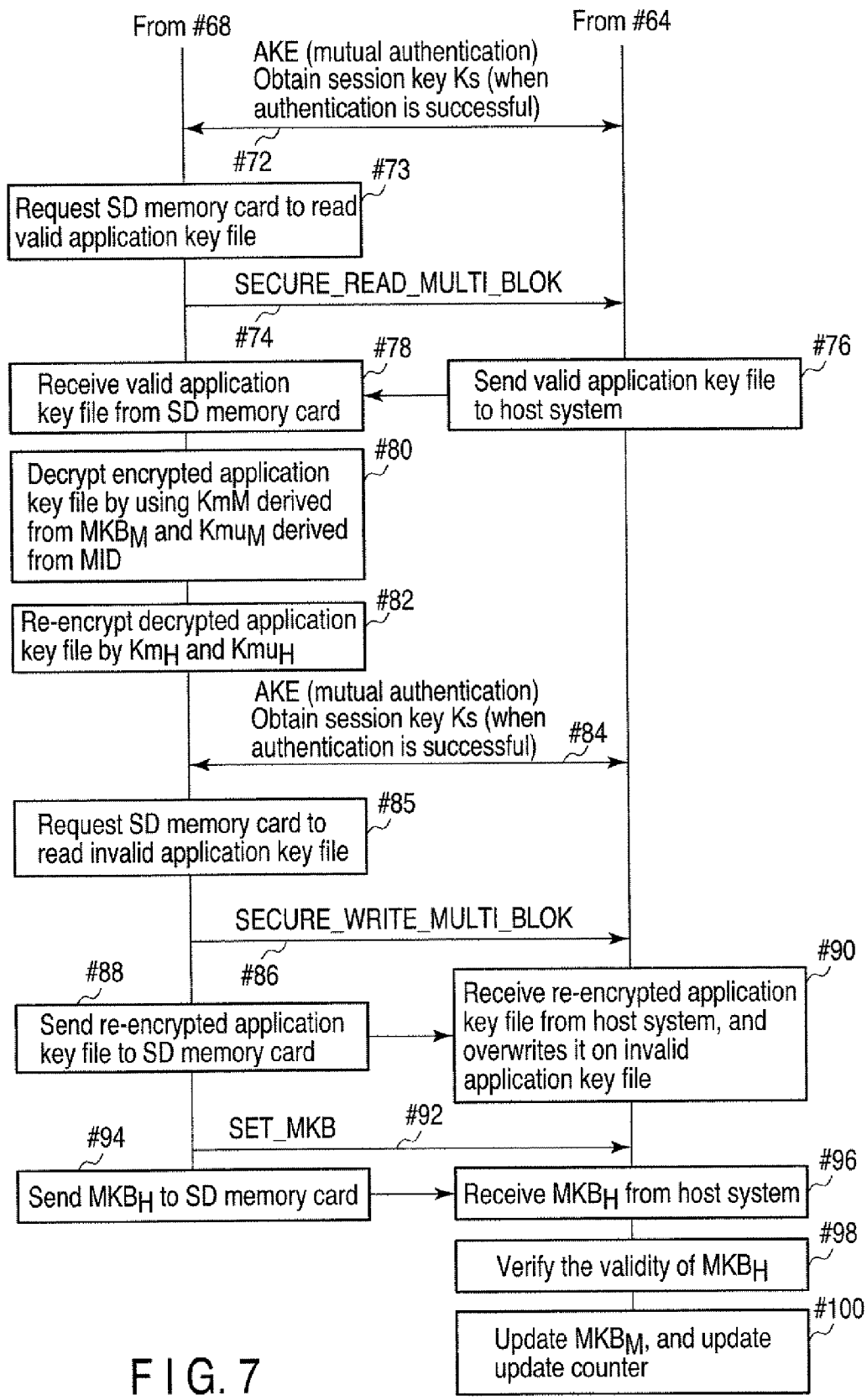
FIG. 7 is an exemplary flowchart showing the latter half of an update process according to an embodiment of the invention.

Next, an explanation will be given of a process of updating a media key block MKB of an SD Memory Card by means of the SD Memory Card 50 and host system 100 according to this embodiment, with reference to the flowcharts of FIGS. 5, 6 and 7.

When the SD Memory Card 50 is inserted into a card slot (not shown) of the host system 100, the host system 100 issues a GET_MKB command (at #12).

The SD Memory Card 50 sends a media key block $MKB_M$ and update counter UC stored in the updatable memory 51 to the host system 100 at block #14. The host system 100 receives the media key block $MKB_M$ and update counter UC from the SD Memory Card 50 in block #16. The host system 100 compares the version number of the $MKB_M$ of the SD Memory Card 50 with the version number of the media key block $MKB_H$ of the host system 100, and updates the media key block $MKB_M$ of the SD Memory Card 50, when the version number of the media key block $MKB_H$ of the host system 100 is newer than the version number of the $MKB_M$ of the SD Memory Card 50. Therefore, when an illegal SD Memory Card is connected to the host system 100, the media key block $MKB_M$ is updated to the latest media key block $MKB_M$, and if the latest media key block MKB includes the data of the inserted card, the card is invalidated. The other cases are out of the scope of the present invention, and an explanation is omitted. Anyway, if the version number of the media key block $MKB_M$ of the SD Memory Card 50 is newer than the version number of the media key block $MKB_H$ of the host system 100, the media key block $MKB_H$ of the host system 100 is updated.

The update counter UC indicates that one of two application key files in the protected area 59 is valid. When the update counter UC is even, the application key file 62 for even numbers is valid and the application key file 64 for odd numbers is invalid. In contrast, when the update counter UC is odd, the application key file 64 for odd numbers is valid and the application key file 62 for even numbers is invalid. This result of identification is used (at #74 and #86).

The host system 100 obtains a media key prime $Km'_H$ by computing one-way function by the received media key block $MKB_M$ and the device key set $Kd_H$ stored in the un-updatable memory 102 in block #18. Specifically, the $Km_H$ obtained by the MKB processor 104 by processing the $Kd_H$ and media key block $MKB_M$ is supplied to the one-way function module 112, and one-way function is computed by using the $Km_H$ and a constant, and the media key prime $Km'_H$ is obtained.

The host system 100 issues a GET_MID command (at #22). The SD Memory Card 50 sends a media identifier MID stored in the un-updatable memory 52 to the host system 100 in block #24. The host system 100 receives the media identifier MID from the SD Memory Card 50 in block #26. The host system 100 obtains an authentication key $Kauth_H$ by computing one-way function by the media key prime $Km'^H$ and media identifier MID in the one-way function module 113 in block #28.

The host system 100 makes mutual authentication (AKE) between the host system 100 and SD Memory Card 50 by using the above authentication key $Kauth_H$ and authentication key $Kauth_M$ stored in the updatable area 51 of the SD Memory Card 50 (at #32). When the mutual authentication is successful, the same session key Ks is generated and shared by the host system 100 and SD Memory Card 50.

The host system 100 searches the media key block $MKB_H$ of the host system 100 corresponding to the device node included in the media identifier MID stored in the un-updatable memory 52 of the SD Memory Card 50, for a 16-byte entry of a media key prime data record in a media key prime media record, and a 6-byte entry of an UV descriptor in an explicit subset difference in a media key prime record.

The host system 100 generates a 32-byte media key prime request $Km'_{Request}$ by connecting a version number of a media key block $MKB_H$, a media key prime data, an UV descriptor, and a padding data "00000000000016" in block #36.

$Km'_{Request}$=Version Number||Media Key Prime Data||UV Descriptor||$000000000000_{16}$ The host system 100 encrypts the media key prime request $Km'_{Request}$ by the shared session key Ks in block #38. An encryption scheme is an CBC mode of AES (hereinafter, this encryption scheme is called an AES_ECBC).

The host system 100 sends the encrypted media key prime request $Km'_{Request}$ to the SD Memory Card 50 through the authentication and key exchange executers 109 and 58 in block #42. The SD Memory Card 50 receives the encrypted media key prim request $Km'_{Request}$ in block #44.

The host system 100 calculates an expected value of a media key prime response in block #46. An expected value of a media key prime response is calculated by computing one-way function using an AES encryption algorithm (hereinafter called an AES_G) by using the media key prime data (stored in the media key block MKB as shown in FIG. 3), and the media key prime Km' derived from the media key block $MKB_H$. The calculated expected value is saved in a not-shown secure memory.

Expected-$Km'_{Request}$=AES_G (Km', Media Key Prime Data)

The SD Memory Card 50 decrypts the media key prime request $Km'_{Request}$ received in block #44 by using the session key Ks shared at #32 (block #48). A decryption scheme is a CBC mode of AES (hereinafter, this decryption scheme is called an AES_DCBC).

The SD Memory Card 50 confirms whether the data received is correctly decrypted by the following equation.

$[AES\_DCBC(Ks, Km'_{Request})]1sb\_48 = 000000000000_{16}$

When the validity of the decrypted data is confirmed, the SD Memory Card 50 (decryption module 54) calculates a candidate value of the media key prime $Km'_H$ by processing MKB by using the decrypted media key prime data request $Km'_{Request}$, device key set $Kd_M$ in the un-updatable memory 52, and a version number of a media key block MKB (block #54). The SD Memory Card 50 saves the obtained candidate value of the media key prim $Km'_H$ in a not-shown secure memory.

The SD Memory Card 50 (one-way function module 55) calculates an authentication key $Kauth_H$ by computing one-way function by the candidate value of the media key prime $Km'_H$ and media identifier MID in block #56. The authentication key $Kauth_H$ is saved as a candidate value in a not-shown secure memory.

The SD Memory Card 50 (one-way function module 56) calculates a 16-byte media key prime response by the following equation by computing one-way function by the candidate value of the media key prime $Km'_H$ and media key prime data (stored in the media key block MKB as shown in FIG. 3) in block #58.

$Km'_{Request}$=AES_G (the candidate Km', Media Key Prime Data)

The host system 100 issues a GET_MKPR command at #62, The SD Memory Card 50 encrypts the media key prime response by the session key Ks, and sends it to the host system 100 in block #64. An encryption scheme is AES_ECBC. The host system 100 receives the encrypted media key prime response from the SD Memory Card 50, and decrypts it by the session key Ks in block #66. A decryption scheme is AES_DCBC.

The host system 100 (data verification processor 108) checks whether the expected value of the media key prime response obtained in block #46 coincides with the media key prime response decrypted in block #66 (block #68). When they coincide with each other, the host system 100 goes to the next block. If they do not coincide, the process is aborted.

The host system 100 makes mutual authentication (AKE) between the host system 100 and SD Memory Card 50 by using the media key block $MKB_M$ in the updatable memory 51 of the SD Memory Card 50 at #72. When the mutual authentication is successful, the host system 100 seeks a new session key Ks before reading or writing data from/to the protected area 59 of the SD Memory Card 50.

The host system 100 requests the SD Memory Card to read a valid application file in block #73.

The host system 100 issues a SECURE_READ_MULTI_BLOCK command at #74. The SD Memory Card 50 reads a valid application key file 62 or 64 from the protected area 59, and sends it to the host system 100 in block #76. The host system 100 receives the valid application key file 62 or 64 from the SD Memory Card 50 in block #78.

The host system 100 decrypts the encrypted application key file by using the media key $Km_M$ derived from the media key block $MKB_M$ and the media unique key $Kmu_M$ derived from the media identifier MID, in block #80. The host system 100 re-encrypts the application key file by using the media key $Km_H$ derived from the media key block $MKB_H$ and the media unique key $Kmu_H$ of the SD Memory Card derived from the media identifier MID, in block #82.

The host system 100 makes mutual authentication (AKE) between the host system 100 and SD Memory Card 50 at #84. When the mutual authentication is successful, the host system 100 seeks a new session key Ks.

The host system 100 requests the SD Memory Card 50 to write in an invalid application file, in block #85.

The host system issues a SECURE_WRITE_MULTI_BLOCK command at #86.

The host system 100 sends the re-encrypted application key file to the SD Memory Card 50 in block #88. The SD Memory Card 50 receives the re-encrypted application key file from the host system 100, and overwrites it on an invalid application key file in the protected area 59, in block #90.

The host system 100 issues a SET_MKB command at #92. The host system 100 sends the media key block $MKB_H$ to the SD Memory Card 50 in block #94. The SD Memory Card 50 receives the media key block $MKB_H$ from the host system 100 in block #96. The SD Memory Card 50 confirms the validity of the media key block $MKB_H$ in block #98 (or in block #96). For example, whether the media key prime Km' stored in the SD Memory Card 50 is correct is confirmed by using the verification data in the media key block MKB (refer to FIG. 3). Or, it is confirmed that the version number of the media key block $MKB_H$ is larger than the version number of the media key block $MKB_M$. Or, it is confirmed that a hash value in the media key block $MKB_H$ is correct.

When the validity of the received media key block $MKB_H$ is confirmed, the SD Memory Card 50 replaces the media key block $MKB_M$ and related authentication key $Kauth_M$ with the media key block $MKB_H$ and candidate authentication key $Kauth_H$, in block #100. Further, the SD Memory Card 50 increments the update counter UC of the media key block MKB. By incrementing the update counter UC, the validity of two application key files is changed, as the update counter UC used by the host system 100 when obtaining the media key block $MKB_M$ from the SD Memory Card 50 has been incremented.

As explained above, a device key set including a device key necessary for encrypting a media key block (key management information) is stored not only in the host system 100, but also in the SD Memory Card 50 having a controller. The host system 100 and SD Memory Card 50 decrypt the media key concealed by the media key block MKB, by using the deice key sets stored in both host system and SD Memory Card. Further, mutual authentication can be continued only when the media unique keys exchanged between the host system and SD Memory Card by using a media identifier are matched.

Further, two or more title keys are encrypted by one application key, and the application key is re-encrypted by a media unique key. As an application key is sized to fit in one sector of a memory, a part to be re-encrypted can be reduced, and the time required for rewriting can be reduced. Thus, even if any error occurs, for example if a memory card is removed from a host system during updating of key management information, written contents can be used.

A memory card confirms the validity of key management information when new key management information is entered, and when the validity is confirmed, a memory card updates the key management information, and increments the update counter.

Two application keys are prepared for each key management information. One is a valid application key, and the other is an invalid application key. A host system counts the number of updating key management information in a memory card, when obtaining key management information from a memory card, and determines which one of the two application keys is valid depending on whether the update counter is an even number or an odd number.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

Modification 1

In the embodiment described herein, the programs executed by the host system 100 and SD Memory Card 50 may be stored in a computer connected to a network such as Internet, and downloaded through the network.

The host system 100 may have a drive, which reads data from computer readable storage media such as a CD-ROM, flexible disc (FD), CD-R, and DVD, and may read and install various programs stored in such storage media through the drive.

Modification 2

In the embodiment described herein, the host system 100 and SD Memory Card 50 are described as two information processing apparatus to authenticate each other. The information processing apparatus are not limited to these two apparatus.

The SD Memory Card 50, as one of the information processing apparatus, previously stores a media key block, a device key set, a media identifier, and a media unique key. This information may not be stored only in one of the processing apparatus. For example, one of the information processing apparatus may have a device key, and may obtain the information from a storage medium, which is removably inserted into the apparatus, and stores a media key block, a media identifier, and a media unique key. In this case, the information processing apparatus uses a media key block stored in the storage medium as usable key management information.

Two information processing apparatus making mutual authentication therebetween may be a drive which reads and writes data from/to an optical magnetic disc such as a DVD, and an information processing apparatus (an application installed in a personal computer) which reads and writes data from/to an optical magnetic disc through the drive. In this case, the information processing apparatus provided with an easily duplicatable application realizes the same function as the SD Memory Card 50, and the drive realizes the same function as the host system 100. In this configuration, a device information number corresponding to a deice key concealed in the application is sent to the drive, and the drive takes out an encrypted media key corresponding to the device information number received from a media key block recorded in an optical magnetic disc, and sends it back to the application. In this configuration, if an illegally duplicated application is distributed, a management association can identify a device key set stored in the illegal application.

Further, the drive may be configured not only to read a media key block from an optical magnetic disc, but also to previously store a media key block in its own a nonvolatile memory, to update a media key block in the nonvolatile memory by using each media key block sent from both optical magnetic disc and application.

Modification 3

In the embodiment described herein, the authentication key Kauth is obtained from the media key prime Km' obtained from the media key Km, and the media unique key Kmu is also obtained from the media key Km. Therefore, the media unique key Kmu may be used Instead of the authentication key Kauth. In this case, the updatable memory 51 of the SD Memory Card 50 stores the media unique key Kmu instead of the authentication key $Kauth_M$.

Further, when the media unique key Kmu is used instead of the authentication key Kauth, the media unique key Kmu may not be stored in the updatable memory 51 of the SD Memory Card. Because, the media unique key Kmu can be obtained by computing in one way by the media key Km and media identifier MID.

Modification 4

In the embodiment described herein, the SD Memory Card 50 has one-way function modules 55 and 56, and performs data conversion by computing one-way function. A converter may be provided to convert data by other operations. Similarly, the host system 100 may have a converter which converts data by other operations, not limited to the one-way function modules 105, 112 and 113.

Modification 5

In the embodiment described herein, a media identifier is used as identification information. Identification information is not limited to a media identifier. Information that can uniquely identify an information processing apparatus may be used. A device key is used as an apparatus secret key. A device secret key may be key information assigned to each information processing apparatus. Further, a device information number is used as identification information. Identification information may be information that identifies an encrypted media key included in a media key block MKB.

What is claimed is:

1. An information processing apparatus to which a storage medium is connected, wherein
the storage medium is configured to store title keys configured to encrypt a content, a first application key and a second application key configured to encrypt the title keys for each application of the content, a media key block, an authentication key, and a media unique key;
the media key block comprises encrypted media keys encrypted by different device keys;
the first application key and the second application key are encrypted by the media unique key;
the media unique key is obtained from a media key and a media identifier;
the information processing apparatus comprises:
a calculation module configured to read the media key block from the storage medium and to obtain an authentication key from the encrypted media keys;
an authentication module configured to read the authentication key from the storage medium and to compare the read authentication key with the obtained authentication key in order to perform a mutual authentication;
an update module configured to read the media unique key and one of the first and second application keys which is valid from the storage medium when the mutual authentication is successful, to decrypt the read application key by the media unique key of the storage medium, to re-encrypt a result of decryption by a media unique key of a host, to supply a result of re-encryption to the storage medium, and to update the other of the first and second application keys which is invalid; and
a supply module configured to supply a media key block stored in the apparatus to the storage medium, and
the storage medium comprises an update module configured to compare the media key block supplied from the information processing apparatus with the media key block stored in the storage medium in order to determine which is newer and to rewrite an old media key block stored in the storage medium with a new media key block supplied from the information processing apparatus.

2. The apparatus of claim 1, wherein the storage medium comprises update count information of the media key block;
the first application key is read and supplied to the information processing apparatus at odd numbers of update; and
the second application key is read and supplied to the information processing apparatus at even numbers of update.

3. The apparatus of claim 1, wherein
a media key is obtained by computing a one-way function by the media key block read from the storage medium and a device key stored in the information processing apparatus; and
a media unique key is obtained by computing the one-way function by the media key and an identifier of the storage medium.

4. The apparatus of claim 1, further comprising:
the calculation module comprises:
a module configured to obtain a media key by computing a one-way function by the media key block read from the storage medium and a device key stored in the information processing apparatus;
a module configured to obtain a media key prime by computing the one-way function by the media key and a constant; and
a module configured to obtain an authentication key by computing the one-way function by the media key prime and an identifier of the storage medium.

5. An authentication method for an information processing apparatus to which a storage medium is connected, wherein the storage medium is configured to store an encrypted content, title keys configured to encrypt a content, first key management information which is updated whenever necessary and which comprises encrypted media keys obtained by encrypting a media key which is a base of an authentication key used for mutual authentication with another apparatus by using different device keys, a first application key and a second application key which encrypt the title keys for each application of the content, and update count information of the first key management information, the information processing apparatus configured to store second key management information which is updated whenever necessary, the method comprising the steps of:
- (i) reading the first key management information from the storage medium, collating the first and second key management information, sending the second key management information to the storage medium, when the second key management information is newer than the first key management information, and updating the first key management information to the second key management information;
- (ii) obtaining the authentication key from the first key management information read from the storage medium, and making mutual authentication with the storage medium by using the authentication key;
- (iii) sending a media key prime request to the storage medium, and obtaining an expected value of a media key prime response from the media key, when the mutual authentication is successful;
- (iv) obtaining a candidate value of a media key prime from a media key in the storage medium receiving the media key prime request, and sending the candidate value to the information processing apparatus; and
- (v) collating an expected value of the obtained media key prime and a candidate value of the received media key prime, and updating the first and second application keys alternately according to the update count of the first key management information, when the expected value coincides with the candidate value.

6. The method of claim 5, wherein the (v) collating comprises:
reading the first application key, encrypting the first application key by a media unique key obtained by computing a one-way function by the media key and a media identifier, and overwriting the encrypted application key on the second application key at odd numbers of update; and
reading the second application key, encrypting the second application key by the media unique key, and overwriting the encrypted application key on the first application key at even numbers of update.

7. The method of claim 5, wherein the (ii) obtaining comprises obtaining the authentication key by computing a one-way function by a media key prime and the media identifier, the media key prime being obtained by computing the one-way function by the media key and a constant.

8. An authentication method for a storage medium and an information processing apparatus, wherein
the storage medium is configured to store title keys configured to encrypt a content, a first application key and a second application key configured to encrypt the title keys for each application of the content, a media key block, an authentication key, and a media unique key;
the media key block comprises encrypted media keys encrypted by different device keys;
the first application key and the second application key are encrypted by the media unique key;
the media unique key is obtained from a media key and a media identifier;
the authentication method comprises:
reading the media key block from the storage medium and obtaining an authentication key from the encrypted media keys, by the information processing apparatus;
reading the authentication key from the storage medium and comparing the read authentication key with the obtained authentication key in order to perform a mutual authentication, by the information processing apparatus;
reading the media unique key and one of the first and second application keys which is valid from the storage medium when the mutual authentication is successful, decrypting the read application key by the media unique key of the storage medium, re-encrypting a result of decryption by a media unique key of a host, supplying a result of re-encryption to the storage medium, and updating the other of the first and second application keys which is invalid, by the information processing apparatus;
supplying a media key block stored in the apparatus to the storage medium, by the information processing apparatus; and
comparing the media key block supplied from the information processing apparatus with the media key block stored in the storage medium in order to determine which is newer and rewriting an old media key block stored in the storage medium with a new media key block supplied from the information processing apparatus, by the storage medium.

* * * * *